(12) United States Patent
Lam (10) Patent No.: US 8,559,431 B2
(45) Date of Patent: Oct. 15, 2013

(54) MULTIPLE LABEL BASED PROCESSING OF FRAMES

(75) Inventor: Richard Shing-Hong Lam, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 12/975,457

(22) Filed: Dec. 22, 2010

(65) Prior Publication Data

US 2012/0163381 A1 Jun. 28, 2012

(51) Int. Cl.
*H04L 12/56* (2011.01)

(52) U.S. Cl.
USPC .......................................................... 370/392

(58) Field of Classification Search
USPC .................................................. 370/254–430
See application file for complete search history.

(56) References Cited

U.S. PATENT DOCUMENTS

| | | | |
|---|---|---|---|
| 5,819,036 A | 10/1998 | Adams et al. | |
| 7,188,180 B2 | 3/2007 | Larson et al. | |
| 7,260,097 B2 | 8/2007 | Casey | |
| 7,418,504 B2 | 8/2008 | Larson et al. | |
| 7,420,933 B2 | 9/2008 | Booth, III et al. | |
| 7,478,167 B2 | 1/2009 | Ould-Brahim et al. | |
| 7,490,151 B2 | 2/2009 | Munger et al. | |
| 7,509,491 B1 | 3/2009 | Wainner et al. | |
| 7,535,856 B2 | 5/2009 | Booth, III et al. | |
| 7,564,802 B2 | 7/2009 | Andrapalliyal et al. | |
| 7,580,372 B2 | 8/2009 | Touve et al. | |
| 7,593,395 B2 | 9/2009 | Ould-Brahim | |
| 7,660,234 B2 | 2/2010 | Ilan et al. | |
| 7,684,426 B2 | 3/2010 | Narvaez et al. | |
| 7,693,144 B2 | 4/2010 | de Heer | |
| 7,697,552 B2 | 4/2010 | Bruckman | |
| 7,778,199 B2 | 8/2010 | Booth, III et al. | |
| 7,792,123 B2 | 9/2010 | Hu | |
| 7,796,593 B1 | 9/2010 | Ghosh et al. | |
| 7,839,850 B2 | 11/2010 | Kompella | |
| 7,848,259 B2 | 12/2010 | Gray et al. | |
| 7,860,112 B2 | 12/2010 | Kompella | |

(Continued)

OTHER PUBLICATIONS

Richard Lam, U.S. Appl. No. 12/974,788, filed Dec. 21, 2010, "Group Member Detection Among Nodes of a Network", Dec. 21, 2010.

(Continued)

*Primary Examiner* — Ayaz Sheikh
*Assistant Examiner* — Debebe Asefa
(74) *Attorney, Agent, or Firm* — Baker Botts L.L.P.

(57) ABSTRACT

A method associated with particular embodiments comprises establishing a connection between a first node and a network composed of a plurality of nodes supporting a plurality of services. Each of the services is supported by at least one of the nodes. The method further includes receiving at a first node a frame from a second node of the plurality of nodes. The frame comprises at least two labels attached to the frame by the second node. The method also includes extracting a first label value and a second label value from the two labels. The method further includes determining that the frame was sent by the second node based on an extracted first label value and that the frame is associated with a first service based on the extracted second label value. The method additionally includes processing the frame based on both of the determinations.

18 Claims, 3 Drawing Sheets

(56) References Cited

U.S. PATENT DOCUMENTS

| | | |
|---|---|---|
| 7,933,267 B1 | 4/2011 | Aggarwal et al. |
| 7,945,654 B2 | 5/2011 | Larson et al. |
| 8,098,665 B2 | 1/2012 | Hu |
| 8,189,585 B2* | 5/2012 | Dharwadkar et al. ......... 370/392 |
| 2003/0112808 A1 | 6/2003 | Solomon |
| 2009/0097490 A1* | 4/2009 | Sanderson et al. ....... 370/395.53 |
| 2010/0332516 A1* | 12/2010 | Page .............................. 707/769 |

OTHER PUBLICATIONS

Data Network Resource, IP Addressing, downloaded from http://www.rhyshaden.com/ipadd.htm on Aug. 13, 2010.

IP Addressing and Subnetting for New Users, Document ID: 13788, Updated Sep. 26, 2005.

USPTO, Non-Final Office Action, U.S. Appl. No. 12/974,788, filed Dec. 21, 2010, in re: Richard Shing-Hong Lam, (12 pgs), Nov. 9, 2012.

* cited by examiner

MULTIPLE LABEL BASED PROCESSING OF FRAMES

TECHNICAL FIELD

The present disclosure relates generally to multiple label based processing of frames.

BACKGROUND

A common feature provided by service providers of virtual local area networks (VLANs) is virtual private LAN service (VPLS). VPLS provides private connections through the service provider's network connecting two or more customer sites. From the customer's perspective, the two or more sites of a VLAN appear to be on the same local LAN, despite the fact that the two or more sites may be on separate networks in different geographic areas. In providing the customer with a VLAN, the service provider may configure the provider's edge routers to which the customer's two or more networks are connected to be members of the same group (the group associated with the customer). Each of the edge routers in the group may further be configured with the services that are to be supported by the group.

One way in which traffic is routed within a VLAN or a VPLS VLAN is through the use of multi-protocol label switching (MPLS). In MPLS frames or packets are assigned labels which are used to make forwarding decisions. Prior to receiving a packet, a node will have told all of its neighbors which labels to use for which services. Each service at each neighbor is assigned a different value. These values are negotiated with an exchange of signaling between the node and its neighbors. Based on the negotiated value of a single label the node is able to determine where the packet is to be forwarded.

BRIEF DESCRIPTION OF THE FIGURES

For a more complete understanding of particular embodiments and their advantages, reference is now made to the following description, taken in conjunction with the accompanying drawings, in which.

DESCRIPTION OF EXAMPLE EMBODIMENTS

Overview

A method, in accordance with particular embodiments, includes establishing a connection between a first node and a network comprising a plurality of nodes supporting a plurality of services. Each service is supported by at least one node of the plurality of nodes. The method also includes receiving at the first node a frame from a second node of the plurality of nodes. The frame comprises at least two labels attached to the frame by the second node. The method additionally includes extracting at the first node a first label value from a first label of the frame. The method further includes determining at the first node that the frame was sent by the second node of the plurality of nodes based on the extracted first label value from the first label. The method also includes extracting at the first node a second label value from a second label of the frame. The method additionally includes determining at the first node that the frame is associated with a first service of the plurality of services based on the extracted second label value from the second label. The method also includes processing the frame at the first node based on both the determination that the frame was sent by the second node and the determination that the frame is associated with the first service.

Example Embodiments

Figure 1:
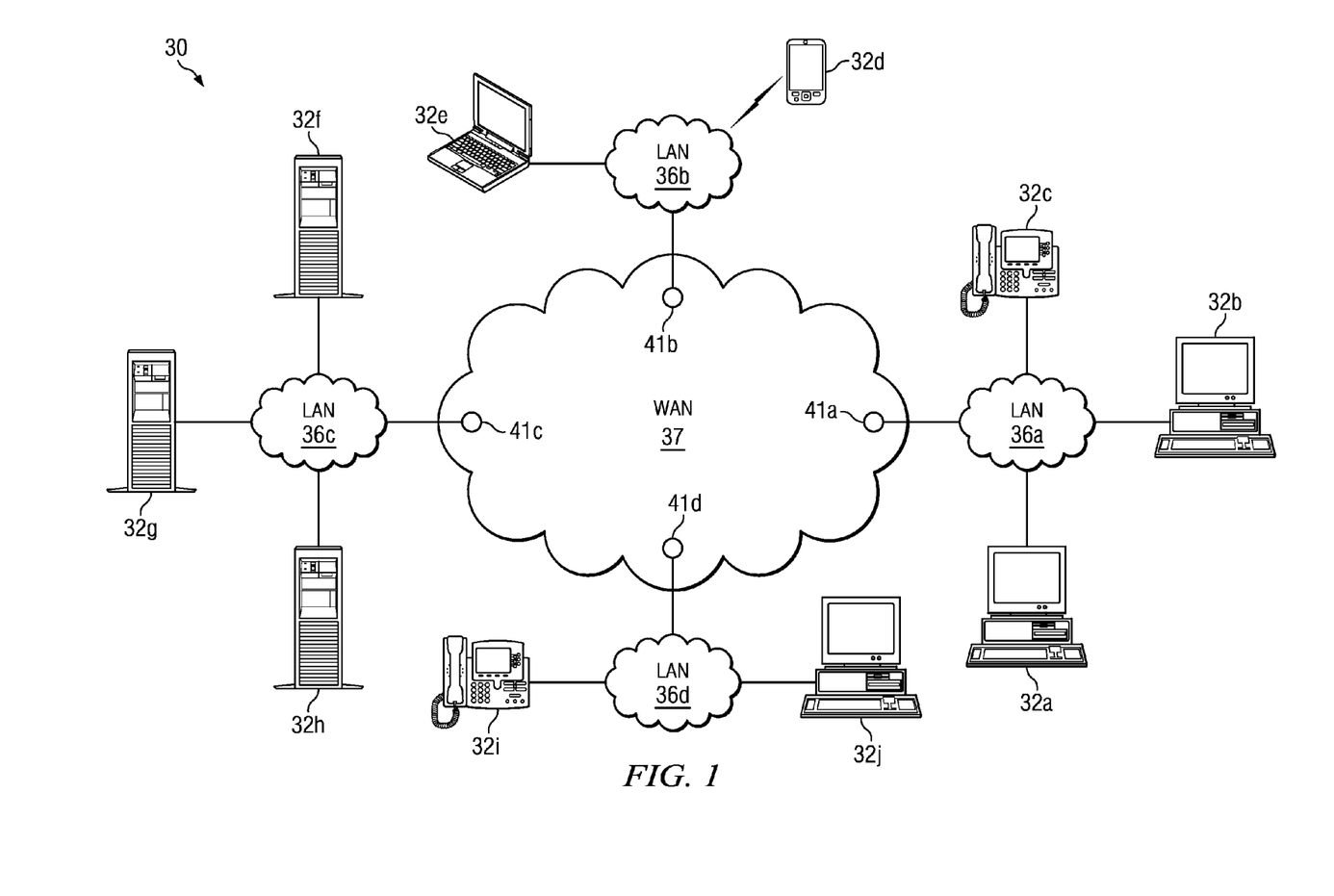
FIG. 1 illustrates a block diagram of a network configured to implement multiple label based processing of frames, in accordance with particular embodiments.

FIG. 1 illustrates a block diagram of a network configured to implement multiple label based processing of frames, in accordance with particular embodiments. As discussed in more detail below, nodes 41 may be able to determine how to process an incoming frame based on the information contained in at least two labels attached to the frame. One of the labels may provide information relating to the sender of the frame and one of the labels may provide information related to the service associated with the frame. Based on the sender and service, the recipient of the frame may be able to determine how to process the packet (e.g., where to forward it). In certain embodiments, the recipient of the frame may be able to determine how to process the frame without having to first exchange signaling with the sending node specifying what label value to use to send frames for the particular service.

As discussed in more detail below, nodes 41 may be able to detect other group members by the subnet portion of the other node's IP address. If node 41*d*, for example, detects a new entry in its routing table that has an IP address with a subnet portion that matches the subnet portion of its own IP address, then node 41*d* may determine that a new member has been added to the group. Once a new member has been detected, node 41*d* may update its configuration to include the new node as a potential destination to forward group packets. When node 41*d* forwards group packets to other nodes of the group, node 41*d* may attach two different labels to the packet, one label that identifies node 41*d* as the sender and one label that identifies the service associated with the packet. This may allow the recipient node to know where the packet came from and the group and service with which the packet is associated. By using two labels, particular embodiments may allow service providers to support millions of services (e.g., in a massively scalable data center).

Communication network 30 includes a plurality of endpoints 32*a*-32*j* having the ability to communicate amongst one another through one or more networks 36 and 37. In certain embodiments, network 37 may be operated by a network service provider and networks 36 may be operated by one or more customers of the network service provider. Networks 36 may be operated at geographically separate sites (e.g., various office sites). In particular embodiments, two or more of networks 36 may be coupled together via a virtual local area network (VLAN) that passes through network 37. The VLAN connected networks 36 may appear to one another as a single LAN. For example, if networks 36*a* and 36*c* were part of the same VLAN, endpoint 32*a* may have the same access to endpoint 32*h* as it does to endpoint 32*b*. In certain embodiments, VLANs may be created, destroyed, and/or modified without the need for extensive configuration or re-configuration of nodes 41. Each VLAN may be referred to as a group, wherein the nodes that are used for the VLAN may be referred to as the group members.

In certain embodiments, each group may have a unique identifier associated therewith, and each node within the group may also have a unique identifier associated therewith. At least one address associated with a node may comprise both identifiers. In particular embodiments, a subnet mask may be used to identify the group identifier portion of the address (e.g., the subnet portion of an IP address) and the node identifier portion of the address (e.g., the host portion of the IP address). Because each group may comprise its own subnet, nodes 41 may detect changes to group membership by detecting changes in, for example, a routing table. For example, the open shortest path first (OSPF) routing protocol adds and removes IP addresses from a routing table. Based on the addresses in the routing table, nodes 41 may be able to determine group membership. For example, if node 41c detects a new IP address in the routing table that has a subnet portion that matches the subnet portion of one of node 41c's IP addresses, then node 41c may determine that a new node has been added to a group to which node 41c is a member.

In particular embodiments, each group may be configured to support one or more services (e.g., voice over IP (VOIP), file transfer protocol (FTP), virtual private network (VPN), virtual private LAN service (VPLS), etc.). Each service may have its own unique identifier. In certain embodiments, when one of nodes 41, for example node 41a, detects that a new node has been added to a group to which node 41a is also a member, node 41a may send (e.g., broadcast or multicast) one or more messages advertising which services it supports. When the new node receives the messages from node 41a it may update its configuration to reflect node 41a being a group member and the services supported by node 41a.

Once configured, when one of nodes 41 sends data related to a service, the data may be sent with at least two labels, one that identifies the sender and one that identifies the service. Using the two labels as well as the advertisements received from other group members, nodes 41 may be able to determine where and how to process incoming traffic.

Networks 36 and 37 may be used in the sending or receiving of communications that comprise any type of media transmitted using any audio, video, and/or data means, including signals, data or messages transmitted through any suitable technology, such as voice devices, text chat, web sessions, streaming media (e.g., streaming video), downloadable media, real-time communications, facsimile, on-line gaming, file transfers, instant messaging and e-mail. The data may be routed through one or more nodes 41 of network 37.

In some embodiments, nodes 41 may represent edge routers (e.g., provider edge routers). Edge routers may comprise routers configured to couple network 37 with external components and/or networks, such as networks 36. Nodes 41 may be coupled to one another via any of a variety of nodes, switches, routers, hubs, and/or servers within network 37. For convenience, none of the intermediary components coupling nodes 41 to one another are depicted.

In the illustrated embodiment, communication network includes a mix of different types and sizes of networks. For example, network 37 is a wide area network (WAN) that enables signaling and communication sessions between a plurality of endpoints 32, LANs 36, and/or nodes 41. WAN network 37 may be distributed across multiple cities and geographic regions, and may be referred to as a metro area network (MAN). In certain embodiments, network 37 may represent one or more networks comprising a network service provider's network. Nodes 41 of network 37 may be connected through any number of additional nodes within network 37, including, but not limited to, switches, hubs, routers, servers, and/or gateways.

Communication networks 36 may be local area networks (LANs) that couple together two or more of endpoints 32. As discussed below, two or more LAN networks 36 may be coupled together in a VLAN via network 37. Accordingly, remote endpoints that are a part of the VLAN may communicate with other endpoints of the VLAN as though they were part of a single LAN. In some situations the two more networks 36 of a VLAN may be operated by the same company. For example, a company may wish to have a VLAN to connect two separate networks, one for a remote server site and one for a local office site.

In certain embodiments, communication network 30 may include additional, fewer, and/or different networks including IP and non-IP networks. For example, in some embodiments, a public switched telephone network (PSTN) may be coupled to network 37 via one or more gateways.

Similar to network 37, each of networks 36 include a plurality of nodes (for simplicity, only nodes 41 of network 37 are depicted) that couple together endpoints 32 and other networks 36 and/or 37. This may allow for the establishment of secure and/or private exchange of data and/or signals between any of endpoints 32 of the same VLAN. Nodes 41 may also be used to communicate control and data signals among each other and between endpoints 32.

Although the illustrated embodiment specifically illustrates particular networks, the term "network" should be interpreted as generally defining any interconnection of components capable of transmitting audio and/or video communication signals, data, and/or messages, including signals, data or messages transmitted through text chat, instant messaging, file transfer, and e-mail. Any one of networks 36 and/or 37 may be a LAN, WAN, global distributed network (e.g., the Internet), an intranet, an extranet, or any other form of wireless or wireline communication network. In addition, networks 36 and 37, in accordance with various embodiments, may include any number of endpoints 32 or nodes 41.

In particular embodiments, one or more of networks 36 and 37 may employ one or more protocols that allow for the addressing or identification of endpoints and/or nodes coupled thereto. For example, using Internet protocol (IP), each of the components coupled together by networks 36 and 37 may be identified using IP addresses. In this manner, networks 36 and 37 may support any form and/or combination of point-to-point, multicast, unicast, or other techniques for exchanging media packets among components in communication network 30. In certain situations, the IP address may comprise a subnet portion and a host portion; the subnet portion may be used to associate a node with a particular group (e.g., a particular VLAN), and the host portion may be used to identify a particular node within the group. Depending on the embodiment, network 37 may utilize one or more different routing protocols such as OSPF, interior gateway routing protocol (IGRP), enhanced IGRP (EIGRP), routing information protocol (RIP) or intermediate system to intermediate system (IS-IS). Networks 36 and 37 may also use any other protocols (e.g., H.323) in transporting data. Any network components, protocols and/or devices capable of exchanging audio, video, or other data using frames or packets are included within the scope of particular embodiments.

Nodes 41 may include any combination of network components, session border controllers, gatekeepers, call managers, conference bridges, routers, hubs, switches, gateways, endpoints, edgepoints, or any other hardware, encoded software, or embedded logic implementing any number of communication protocols that allow for the exchange of packets in communication network 30. In particular embodiments, one or more of nodes 41, may be under the control of a computer system, security database, service provider, organization, entity or any other responsible component or entity. For example, a service provider may be responsible for creating and/or managing one or more VLANs. The service provider may determine and/or assign a subnet value to be used to identify the group. The service provider may also be responsible for configuring the services that are to be supported by each group.

It will be recognized by those of ordinary skill in the art that endpoints 32 and nodes 41 may comprise any combination of hardware, encoded software, or embedded logic that provides network services to a user. For example, endpoints 32 may include a telephone, a computer, a media server, a file server, a video monitor, a camera, an IP phone, a cell phone or any other communication hardware, encoded software, or embedded logic running on a computer that supports the communication of packets (or frames) using networks 36 and/or 37. Endpoints 32 may also include unattended or automated systems, gateways, other intermediate components or other devices that can establish communication sessions. Although FIG. 1 illustrates a particular number and configuration of endpoints, nodes, and networks, communication network 30 contemplates any number or arrangement of such components for communicating data. In addition, elements of communication network 30 may include components centrally located (local) with respect to one another or distributed throughout communication network 30.

Figure 2:
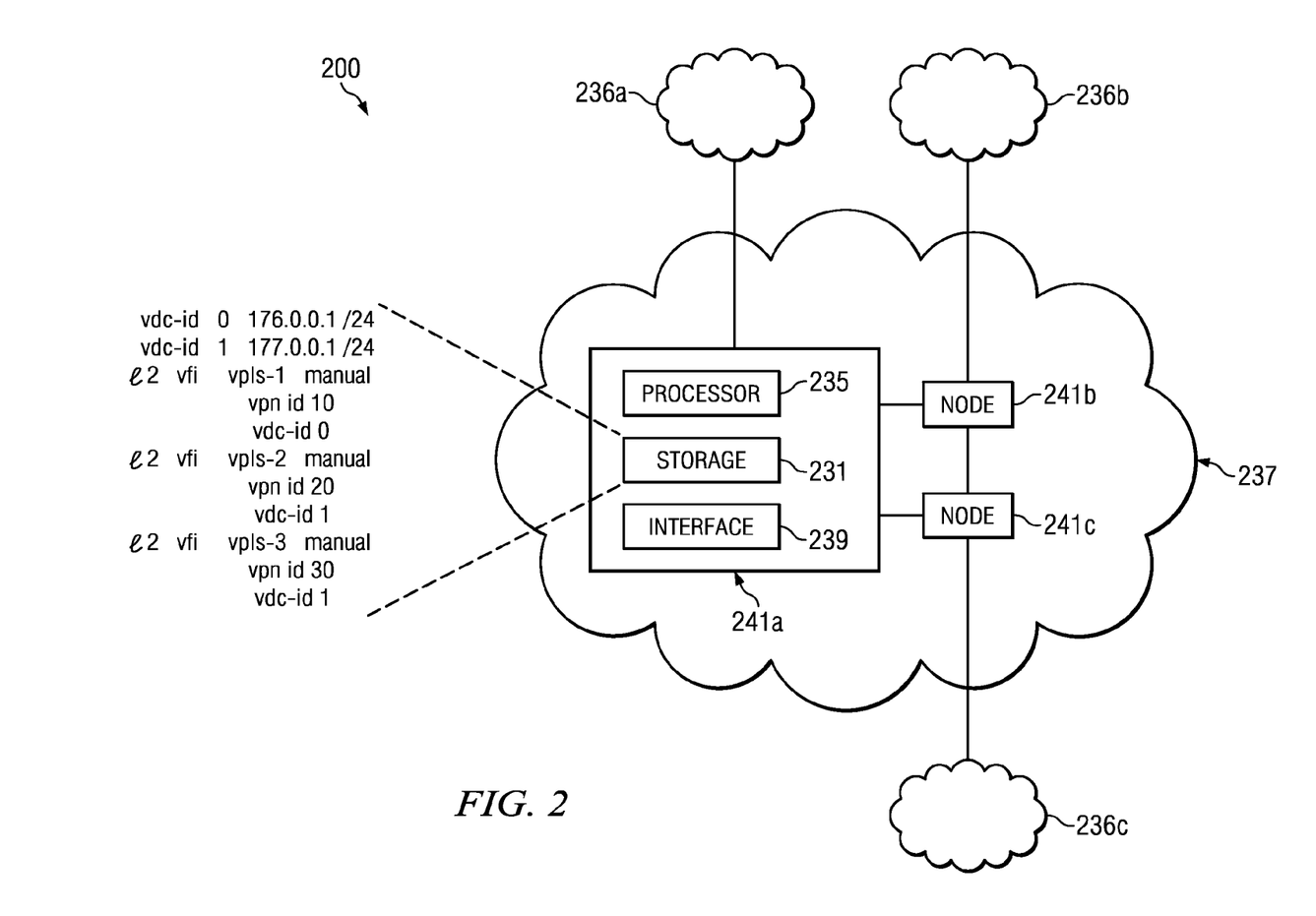
FIG. 2 illustrates a more detailed block diagram of a node of a network, in accordance with particular embodiments.

FIG. 2 includes a more detailed block diagram of a node of a network, in accordance with particular embodiments. More specifically, communication network 200 comprises provider network 237 and customer networks 236. Customer networks 236 may represent LANs being operated at various office sites for a particular company. Provider network 237 may represent a WAN maintained by a service provider to supply customers with network access. In certain embodiments, network 237 may support using one or more VLANs to connect two or more of networks 236. Networks 236 and 237 may comprise any of the features, protocols, and/or components discussed above with respect to networks 36 and 37 of FIG. 1.

In the depicted embodiment, each customer network 236 is coupled to provider network 237 via a respective node 241. Nodes 241 may be edge routers at the entry point or border between customer networks 236 and provider network 237. Though only three nodes are depicted, provider network 237 may comprise any number of nodes, including additional edge nodes for connecting to additional customer networks as well as additional intermediary nodes for routing traffic between nodes 241.

Nodes 241 may facilitate establishment of VLANs through provider network 237. In particular embodiments, each VLAN has a group of nodes 241 associated therewith. A particular group may comprise two or more nodes 241 connecting two or more customer networks 236 in a particular VLAN (e.g., a VPLS VLAN). For example, a group, associated with a VLAN comprising customer networks 236a and 236b, may comprise nodes 241a and 241b. Each node 241 of the group of nodes may be assigned an IP address comprising a unique subnet portion and a unique host portion. The subnet portion is unique to each group (e.g., each VLAN) within provider network 237, and the host portion is unique to each member (e.g., each node 241) within the group. A subnet mask may be used to indicate the division between the two portions of the IP address. As will be discussed in more detail below, the subnet portion of the IP address may be used by nodes 241 to determine when nodes have been added or removed from a group.

When a node, such as node 241a, sends a frame to another node, such as node 241b) within same group, the frame may comprise two labels, one that identifies a service (e.g., 12 vfi vpls-1) associated with the frame and one that identifies node 241a as the sender. Node 241b may receive the frame and, based on the two labels, determine who sent the frame, what group the frame is associated with, what service the frame is associated with, and how to process the frame.

In the depicted embodiment, node 241a comprises storage 231, processor 235, and interface 239. For simplicity, the components of nodes 241b and 241c are not depicted, though in certain embodiments they may comprise similar, though not necessarily identical, components.

Processor 235 may be a microprocessor, controller, application specific integrated circuit (ASIC), field-programmable gate array (FPGA), or any other suitable computing device, resource, or combination of hardware with encoded software or embedded logic operable to provide, either alone or in conjunction with other node 241a components (e.g., storage 231 and/or interface 239) node functionality. Such functionality may include establishing, maintaining, and updating one or more VLANs comprising one or more groups of one or more group members. Additional functionality may include determining where and how to forward packets based on two labels attached to the packet. One of the labels may identify the sender and the other label may identify the service associated with the packet.

Storage 231 may be any form of computer-readable storage media encompassing one or more tangible computer-readable storage media possessing structures. Storage 231 may comprise any volatile or non-volatile memory including, without limitation, magnetic media (e.g., magnetic tape, hard disk, or floppy disk), optical media, semiconductor-based or other integrated circuit (IC) based media (such, as for example, a field-programmable gate array (FPGA) or an application-specific IC (ASIC)), holographic storage media, random access memory (RAM), read-only memory (ROM), erasable programmable ROM (EPROM), electrically erasable programmable ROM (EEPROM), removable media, solid state memory, flash memory, or any other suitable local or remote memory component or a combination of two or more of these, where appropriate.

Storage 231 may store any suitable data or information, including encoded software, or embedded logic, utilized by node 241a and/or processor 235. For example, storage 231 may store a table, list, or other organization of data identifying the group or groups to which node 241a is a member, the services supported by node 241a, the group with which each service is associated, the identifiers or labels associated with other group members, the identifiers or labels associated with each service, and/or any other information that may be used in processing and/or forwarding traffic among group members. As another example, in certain embodiments, storage 231 may embody logic configured to perform any of the functionality disclosed herein. The logic may be stored or embodied in storage 231 as encoded software encompassing one or more applications, bytecode, one or more computer programs, one or more executables, one or more instructions, logic, machine code, one or more scripts, or source code, and vice versa, where appropriate. Particular embodiments may use any suitable encoded software written or otherwise expressed in any suitable programming language or combination of programming languages stored or encoded in any suitable type or number of computer-readable storage media.

Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Interface 239 may comprise any hardware combined with any encoded software, or embedded logic used to send and receive information with other components of communication network 200 and/or with one or more users (e.g., a network administrator). Interface 239 may, for example, transmit a broadcast or multicast message to nodes 241 advertising the services supported by node 241a. Depending on the embodiment, interface 239 may provide any wired or wireless connection and support any wired or wireless protocol necessary to allow node 241a to communicate with the other components of communication network 200 and/or to communicate with one or more users (e.g., network administrators).

The following example may help to illustrate certain features and benefits of particular embodiments. For purposes of this example, assume that customer networks 236a and 236b are operated by the same customer. Further assume that the customer has contacted the service provider responsible for operating provider network 237 and has requested a VLAN connecting customer networks 236a and 236b. In this scenario, the VLAN may be implemented via VPLS. For purposes of discussion herein, specific identification examples from the scenario depicted in FIG. 2 are included in parenthesis where appropriate. These values are merely provided for illustration and are not intended to be indicative of actual values or to be otherwise limiting.

In response to receiving the request to establish the VLAN, a network administrator for the service provider may configure nodes 241a and 241b via the respective interface (e.g., interface 239) for each of nodes 241a and 241b. Assuming that the network administrator begins with node 241a, interface 239 may receive one or more configuration messages. The configuration messages may comprise an IP address (e.g., 176.0.0.1 or 177.0.0.1) and subnet mask (e.g., /24). The IP address and subnet mask may be uniquely associated with the requested VLAN and node 241a. For example, the IP address may comprise a subnet portion (e.g., 176.0.0, the first 24 bits of the IP address) which uniquely identifies the group associated with the customer's VLAN. The IP address may also comprise a host portion (e.g., .1, the last 8 bits) which uniquely identifies node 241a within the group associated with the VLAN requested by the customer. The subnet mask may define which portion of the IP address is the subnet portion and which portion of the IP address is the host portion.

The configuration messages may also include information identifying one or more services (e.g., 12 vfi vpls-1) that are to be supported by the customer's VLAN. Each service may have its own service identifier (e.g., vpn id 10) associated therewith. In some embodiments, depending on the situation, if node 241a is a member of more than one group, or if network 237 comprises more than one group (VLAN), the configuration messages may include an identifier indicating which group a particular service is associated with (e.g., vdc-id 0). In the depicted embodiment, node 241a has been configured to be a part of two groups (vdc-id 0 and vdc-id 1) with one service (vpls-1) being associated with the first group and two services (vpls-2 and vpls-3) being associated with the second group. The different IP addresses assigned to node 241a may be used for different connections associated with different VLANs. The configuration information received by interface 239 may be stored in storage 231. In some embodiments, once node 241a has been configured, interface 239 may send out a broadcast or multicast message identifying the services that it supports. The message may be broadcast or multicast to members of the same subnet or subnets to which node 241a is a member.

The network administrator may then configure node 241b in a similar fashion. For purposes of this example, assume that node 241b is only a member of the first group and only supports the first service. Further assume that node 241b is the second node in the group and has an IP address with a host portion of .2. Thus, node 241b's IP address may be 176.0.0.2.

Network 237 may use any of a variety of routing protocols to determine and/or generate routes through network 237. Part of the function of a routing protocol is to build routing tables at the various nodes within the network. The routing tables may, among other functions, identify neighboring nodes and their associated IP addresses. Storage 231 may be used in storing the routing table created for node 241a. Processor 235 may determine that a node in the routing table is part of the same group, or groups, as node 241a by comparing the subnet portion of the node's IP address in the routing table with the subnet portion of node 241a's IP address. For example, in the depicted scenario, when node 241a detects a new entry for node 241b having an IP address of 176.0.0.2, processor 235 may determine that the subnet portion (176.0.0) matches the subnet for one of the groups of which node 241a is a member. Once processor 235 has recognized the presence of a new group member, processor 235 may generate a broadcast or multicast message to be sent by interface 239. The broadcast or multicast message may be sent to the members of the group for which processor 235 detected the new node, node 241b. The broadcast or multicast message may comprise information regarding which services node 241a supports for the respective group.

When node 241b receives the broadcast or multicast message sent by node 241a, node 241b may update its configuration and store the information in its own storage. The stored information may be used to update records stored by the storage of node 241b indicating which services are supported by which nodes of which group. The information may also be used to update the label values associated with the commonly supported services.

Once the nodes have been configured, they may be ready to process packets associated with the VLAN. When interface 239 receives a VLAN packet from customer network 236a, processor 235 may stack two MPLS labels onto the packet before sending it to node 241b on its way to customer network 236b. In certain embodiments, the first of the two labels may identify node 241a as the sender of the forwarded packet. The sender identification may comprise less than the full IP address of node 241. This may be a result of the MPLS label supporting only twenty bit labels (as compared to the thirty-two bits used for the full IP address). The second label may identify the service with which the packet is associated. In some embodiments, the label values may be based on a common scheme so that it may be possible for other nodes to determine the service and sender associated with the frame. This determination may be made without the sending or receiving node having first negotiated a specific label value to be used. For example, the label value used to identify the sender may comprise a concatenation of a base value common to the group (but not the full subnet address associated with the group) and the host portion of the sender's IP address. As another example, the label value used to identify the service may comprise a twenty-bit label value. The label value may be assigned or configured by the service provider when the service is being initialized or configured. The label value may be unique to the service such that it may be used by any node supporting the respective service.

Using the two labels, node 241b may receive all the information that it needs to properly process and/or forward the packet. The processor of node 241b may be able to determine who sent the packet based on the sender identification, what service the packet is associated with based on the service identification, and what group the packet is associated with based on the sender identification and/or the service identification.

Thus far, several different embodiments and features have been presented. While particular customer networks 236, nodes 241, and provider network 237 are depicted, communication network 200 may comprise any number of networks, devices and/or components. Particular embodiments may combine one or more features depending on operational needs and/or component limitations. This may allow for great adaptability to the needs of various organizations and users. Some embodiments may include additional features. Furthermore, particular embodiments may be employed in any system that supports the use of packet labels and/or VLANs.

Figure 3:
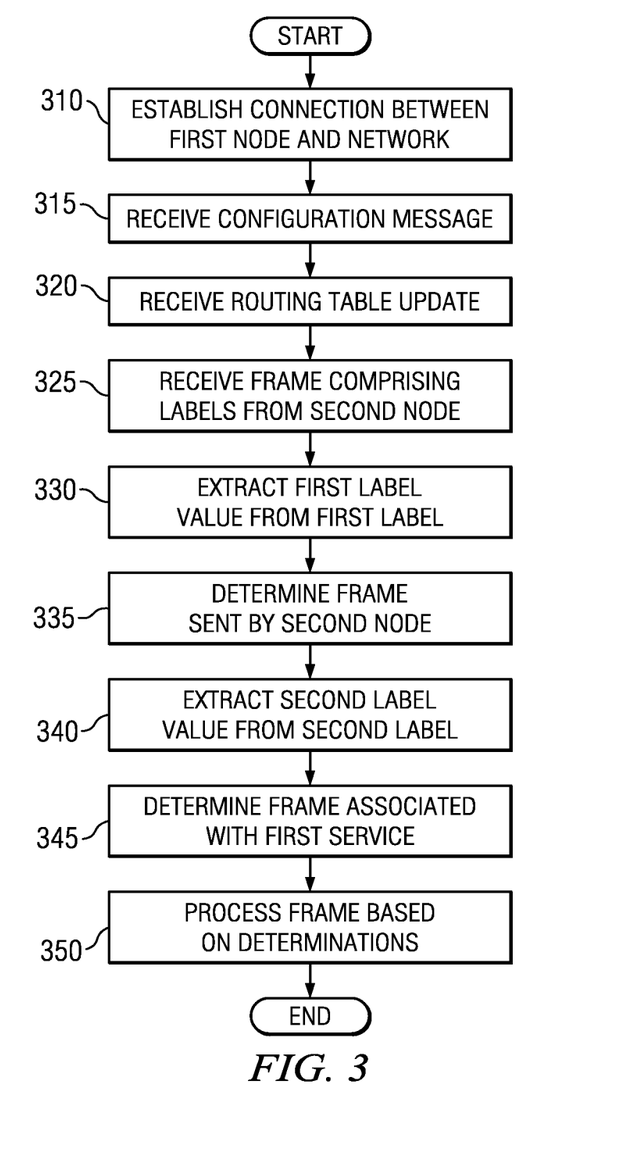
FIG. 3 illustrates a method for multiple label based processing of frames, in accordance with particular embodiments.

FIG. 3 illustrates a method for multiple label based processing of frames, in accordance with particular embodiments. In the depicted embodiment, it may be assumed that the following steps are being performed by a node (hereinafter the first node), such as node 241*a* described above with respect to FIG. 2.

The method begins at step 310 with the establishment of a connection between the first node and a network of nodes. In some embodiments and/or scenarios the first node may be establishing a connection to a data center VLAN. The data center VLAN may be implemented via VPLS. The nodes of the network may be members of one or more groups and may support one or more services within the group. Each group may be a separate VLAN. While it may be the case that all the members of a group support the same services, it is not required. This may be the case where an older node does not have the technology or capabilities to support a service, or where the node has been specifically configured to not support a service.

At step 315 a configuration message is received. The configuration message may comprise an IP address for the first node and/or at least one parameter associated with each service to be supported by the first node. In some embodiments, this information may be received via multiple different configuration messages. The IP address may include a subnet portion and a host portion, as defined by a subnet mask. The subnet portion may be associated with a group of nodes, such as the nodes used in a particular VLAN. The host portion may uniquely identify the first node within the group identified by the subnet portion. The first node may be configured with multiple IP addresses when it is a member of multiple groups (e.g., where more than one VLAN is to be supported by the first node). The parameters associated with each service may comprise information indicative of the type of service, features or limits to be placed on the service (e.g., priority levels, QoS constraints, etc.), or any other parameters that may be relevant in implementing the service. The parameters for the service may also specify the group or groups in which the service is to be supported.

At step 320 an update to a routing table maintained by the first node is received. The update may be generated via a routing protocol. For example, the first node may be an edge router within a network using a routing protocol such as OSPF, IGRP, EIGRP, RIP, or IS-IS. The routing protocol may create, update, and/or maintain the routing table for the first node. The routing table may comprise IP addresses associated with other nodes. These addresses may be used by the first node to determine which nodes are members of the same group as the first node. For example, by looking at the subnet portion of the IP addresses in the routing table the first node may be able to determine which nodes are members of the same group a the first node (e.g., those nodes with IP addresses having subnet portions matching the subnet portion of the first node's IP address).

At step 325 a frame from a second node of the plurality of nodes is received. The frame may be received with at least two labels attached to the frame by the second node. In some embodiments, the frame may be consistent with the MPLS protocol and the two labels may be MPLS labels. The two labels may be used by the first node to determine the node that sent the frame (see steps 330-335) and the service with which the frame is associated (see steps 340-345). These determinations may be made without the first and second nodes having first negotiated specific values to be used for the two labels.

At step 330 the first node extracts a first label value from a first label of the frame. In some embodiments, extracting the first label value may comprise removing a base value added or appended to the first label value within the first label. The base value may be added to provide the first label a sufficient number of bits to comply with the standard being used (e.g., MPLS) to form the labels. In some embodiments, an algorithm may be used to determine the first label value from the first label.

At step 335 the first node determines that the frame was sent by the second node of the plurality of nodes based on the extracted first label value from the first label. For example, prior to receiving the frame, the first node may have determined and stored a node identifier associated with the second node based on the IP address associated with the second node. The node identifier may identify the group with which the second node is a part of in addition to uniquely identifying the second node within the respective group. The first node may then simply compare the extracted first label value to a predetermined table of node identifiers to find the node identifier for the second node.

At step 340 the first node extracts a second label value from a second label of the frame. Similar to extracting the first label value, the first node may remove a base number or apply an algorithm to determine the second label value from the second label. In some embodiments, the second label may be stacked with the first label according to the MPLS protocol.

At step 345 the first node determines that the frame is associated with a first service of the plurality of services. For example, prior to receiving the frame, the first node may have determined and stored a service identifier associated with the first service. The service identifier may have been determined from the configuration message received at step 315. For example, the first node may apply an algorithm to one or more of the received parameters associated with the service. The first node may then simply compare the extracted second label value to a table of predetermined service identifiers to find the service identifier associated with the first service.

At step 350 the first node process the frame based on both the determination that the frame was sent by the second node and the determination that the frame is associated with the first service. In some embodiments, processing the frame comprises forwarding the frame to a third node based on both the determination that the frame was sent by the second node and the determination that the frame is associated with the first service. The third node may also be a member of the same group as the first and second nodes.

Some of the steps illustrated in FIG. 3 may be combined, modified or deleted where appropriate, and additional steps may also be added to the flowchart. Additionally, steps may be performed in any suitable order without departing from the scope of particular embodiments. For example, while in the depicted embodiment the labels were stacked such that the first node determines the sender and then the service, in other embodiments the labels may be reversed such that the first node determines the service and then the sender.

Technical advantages of particular embodiments may include communicating information regarding both the sender and the service associated with a frame through multiple labels. Because the labels provide sufficient information for the recipient to process the frame, there is no need for the sender and recipient of the frame to have negotiated specific label values prior to the frame being sent. This may reduce the amount of signaling traffic sent over a provider's network. Another technical advantage of using multiple labels may be to allow service providers to support millions of services in, for example, a massively scalable data center.

Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. It is intended that particular embodiments encompass all such changes, substitutions, variations, alterations and modifications as falling within the spirit and scope of the appended claims. For example, although an embodiment has been described with reference to a number of elements included within network 30, such as nodes and endpoints, these elements may be combined, rearranged or positioned in order to accommodate particular routing needs. In addition, any of these elements may be provided as integrated internal or separate external components to each other where appropriate. Particular embodiments contemplate great flexibility in the arrangement of these elements as well as their internal components.

What is claimed:

1. A method comprising:
    establishing a connection between a first node and a network comprising a plurality of nodes supporting a plurality of services, each service supported by at least one node of the plurality of nodes;
    receiving at the first node a frame from a second node of the plurality of nodes, the frame comprising at least two labels attached to the frame by the second node;
    extracting at the first node a first label value from a first label of the frame;
    determining at the first node that the frame was sent by the second node of the plurality of nodes based on the extracted first label value from the first label;
    extracting at the first node a second label value from a second label of the frame;
    determining at the first node that the frame is associated with a first service of the plurality of services based on the extracted second label value from the second label; and
    processing the frame at the first node based on both the determination that the frame was sent by the second node and the determination that the frame is associated with the first service.

2. The method of claim 1, further comprising receiving at the first node at least one configuration message comprising at least one parameter associated with the first service.

3. The method of claim 1:
    further comprising receiving at the first node an update to a routing table, the update providing an IP address associated with the second node; and wherein determining that the frame was sent by the second node of the plurality of nodes based on the extracted first label value from the first label comprises determining a node identifier associated with the second node based on the IP address associated with the second node and comparing the extracted first label value to the node identifier.

4. The method of claim 1, wherein processing the frame comprises forwarding the frame to a third node based on both the determination that the frame was sent by the second node and the determination that the frame is associated with the first service.

5. The method of claim 1, wherein the first node receives the frame from the second node without the first node negotiating with the second node on a specific value to be used for the first service.

6. The method of claim 1, wherein:
    establishing a connection between a first node and network comprises establishing a connection between the first node and a data center virtual local area network comprising a plurality of nodes supporting a plurality of services, each service supported by at least one node of the plurality of nodes; and
    receiving at the first node a frame from a second node of the plurality of nodes, the frame comprising at least two labels attached to the frame by the second node comprises receiving at the first node a multiprotocol label switching (MPLS) frame from a second node of the plurality of nodes, the MPLS frame comprising at least two MPLS labels attached to the frame by the second node.

7. Logic embodied in a non-transitory computer readable medium comprising code that when executed by a processor is configured to:
    establish a connection between a first node and a network comprising a plurality of nodes supporting a plurality of services, each service supported by at least one node of the plurality of nodes;
    receive at the first node a frame from a second node of the plurality of nodes, the frame comprising at least two labels attached to the frame by the second node;
    extract at the first node a first label value from a first label of the frame;
    determine at the first node that the frame was sent by the second node of the plurality of nodes based on the extracted first label value from the first label;
    extract at the first node a second label value from a second label of the frame;
    determine at the first node that the frame is associated with a first service of the plurality of services based on the extracted second label value from the second label; and
    process the frame at the first node based on both the determination that the frame was sent by the second node and the determination that the frame is associated with the first service.

8. The medium of claim 7, wherein the logic is further configured to receive at the first node at least one configuration message comprising at least one parameter associated with the first service.

9. The medium of claim 7:
    wherein the logic is further configured to receive at the first node an update to a routing table, the update providing an IP address associated with the second node; and
    wherein the logic configured to determine that the frame was sent by the second node comprises logic further configured to determine a node identifier associated with the second node based on the IP address associated with the second node and to compare the extracted first label value to the node identifier.

10. The medium of claim 7, wherein the logic configured to process the frame comprises logic configured to forward the frame to a third node based on both the determination that the frame was sent by the second node and the determination that the frame is associated with the first service.

11. The medium of claim 7, wherein the first node receives the frame from the second node without the first node negotiating with the second node on a specific value to be used for the first service.

12. The medium of claim 7, wherein:
the logic configured to establish a connection between a first node and network comprises logic configured to establish a connection between the first node and a data center virtual local area network comprising a plurality of nodes supporting a plurality of services, each service supported by at least one node of the plurality of nodes; and
the logic configured to receive at the first node a frame from a second node of the plurality of nodes, the frame comprising at least two labels attached to the frame by the second node comprises logic configured to receive at the first node a multiprotocol label switching (MPLS) frame from a second node of the plurality of nodes, the MPLS frame comprising at least two MPLS labels attached to the frame by the second node.

13. An apparatus comprising:
an interface configured to:
establish a connection between a first node and a network comprising a plurality of nodes supporting a plurality of services, each service supported by at least one node of the plurality of nodes; and
receive at the first node a frame from a second node of the plurality of nodes, the frame comprising at least two labels attached to the frame by the second node; and
a processor coupled to the interface and configured to:
extract at the first node a first label value from a first label of the frame;
determine at the first node that the frame was sent by the second node of the plurality of nodes based on the extracted first label value from the first label;
extract at the first node a second label value from a second label of the frame;
determine at the first node that the frame is associated with a first service of the plurality of services based on the extracted second label value from the second label; and
process the frame at the first node based on both the determination that the frame was sent by the second node and the determination that the frame is associated with the first service.

14. The apparatus of claim 13, wherein the interface is further configured to receive at the first node at least one configuration message comprising at least one parameter associated with the first service.

15. The apparatus of claim 13:
wherein the interface is further configured to receive at the first node an update to a routing table, the update providing an IP address associated with the second node; and
wherein the processor configured to determine that the frame was sent by the second node is further configured to determine a node identifier associated with the second node based on the IP address associated with the second node and comparing the extracted first label value to the node identifier.

16. The apparatus of claim 13, wherein the processor configured to process the frame is further configured to forward the frame to a third node based on both the determination that the frame was sent by the second node and the determination that the frame is associated with the first service.

17. The apparatus of claim 13, wherein the first node receives the frame from the second node without the first node negotiating with the second node on a specific value to be used for the first service.

18. The apparatus of claim 13, wherein the interface configured to:
establish a connection between a first node and network comprises an interface configured to establish a connection between the first node and a data center virtual local area network comprising a plurality of nodes supporting a plurality of services, each service supported by at least one node of the plurality of nodes; and
receive at the first node a frame from a second node of the plurality of nodes, the frame comprising at least two labels attached to the frame by the second node comprises an interface configured to receive at the first node a multiprotocol label switching (MPLS) frame from a second node of the plurality of nodes, the MPLS frame comprising at least two MPLS labels attached to the frame by the second node.

* * * * *